United States Patent [19]

Enokimoto et al.

[11] 4,288,096
[45] Sep. 8, 1981

[54] FRONT WHEEL SUSPENSION MECHANISM FOR VEHICLE

[75] Inventors: Akito Enokimoto, Asaka; Toshio Tsuchiya, Kawagoe; Tatsuo Masuda, Niiza; Suwaji Takano, Urawa, all of Japan

[73] Assignee: Honda Giken Kogyo Kabushiki Kaisha, Tokyo, Japan

[21] Appl. No.: 83,628

[22] Filed: Oct. 11, 1979

[30] Foreign Application Priority Data

Oct. 13, 1978 [JP] Japan ................................ 53/125947

[51] Int. Cl.³ .............................................. B60G 3/18
[52] U.S. Cl. ................................... 280/694; 280/718
[58] Field of Search ............... 280/96.1, 660, 673, 280/669, 718, 719, 694, 93, 95 R, 662, 671, 674, 690, 691, 699; 268/41, 54 A, 158, 19 A, 38, 30

[56] References Cited

U.S. PATENT DOCUMENTS

| 1,841,849 | 1/1932 | Rohr | 280/669 |
| 1,919,670 | 7/1933 | Roos | 280/669 |

FOREIGN PATENT DOCUMENTS

| 868116 | 2/1953 | Fed. Rep. of Germany | 280/673 |
| 710567 | 6/1954 | United Kingdom | 280/673 |

*Primary Examiner*—Joseph F. Peters, Jr.
*Assistant Examiner*—Randall A. Schrecengost
*Attorney, Agent, or Firm*—Irving M. Weiner; Pamela S. Burt; John L. Shortley

[57] ABSTRACT

A front wheel suspension mechanism for a vehicle having two front wheels. The suspension mechanism includes two transverse leaf springs mounted on a front portion of the frame of the vehicle and vertically spaced apart from each other, supports for supporting the front wheels, and elastic members for connecting both ends of the leaf springs and the front wheel supports.

5 Claims, 9 Drawing Figures

FRONT WHEEL SUSPENSION MECHANISM FOR VEHICLE

BACKGROUND OF THE INVENTION

The present invention relates generally to a front wheel suspension mechanism for a vehicle. More particularly, the invention relates to a front wheel suspension mechanism for a vehicle which has two front wheels and which has a small size, is light in weight, and has a simplified construction.

SUMMARY OF THE INVENTION

The present invention provides a front wheel suspension mechanism for a vehicle having right and left front wheels, in which two transverse leaf springs are arranged on and fixed to a front portion of the frame of the vehicle in vertically spaced relation to each other. Both end portions of the leaf springs are connected to supports for supporting the front wheels. Between the end portions of the leaf springs and the supports of the front wheels there are provided elastic members made of, for example, rubber.

The present invention provides the advantage that a single member functions as both a front wheel suspending member and a shock absorbing member. Further, due to the provision of flexible members, the front wheels can be supported with shock absorbing effects. In accordance with the invention, both of such advantages can be attained in a simplified construction, employing a minimum number of parts.

An object of the present invention is to provide a vehicle front wheel suspension mechanism, wherein king pins positioned substantially at a right angle with respect to the front wheel axle are supported at their upper and lower ends between the leaf spring ends which are vertically spaced and extended rightwardly and leftwardly of the vehicle frame. Elastic members are sandwiched between the ends of the leaf springs and the upper and lower ends of the king pins, and the elastic members are compressed axially of the king pins so that the preferred elasticity may be easily preset, whereby the supports of the front wheels are ensured and strengthened, and the shock absorbing effects as well as the vibration absorbing and attenuating effects are enhanced.

A further object of the invention is to provide a vehicle front wheel suspension mechanism wherein the frame, which has a box-shaped cross section, is interposed between and connected to the vertically spaced transverse leaf springs so as to provide stoppers for the vertical warping motions of the ends of the leaf springs.

A further object of the present invention is to provide a vehicle front wheel suspension mechanism, wherein a front wheel steering mechanism is arranged at the back of the vertically spaced transverse leaf springs so that the steering mechanism is protected by the leaf springs disposed in front thereof.

Other objects and advantages of the present invention will become apparent from the following description, when read in conjunction with the accompanying drawings.

DETAILED DESCRIPTION OF PREFERRED EMBODIMENTS

Figure 1:
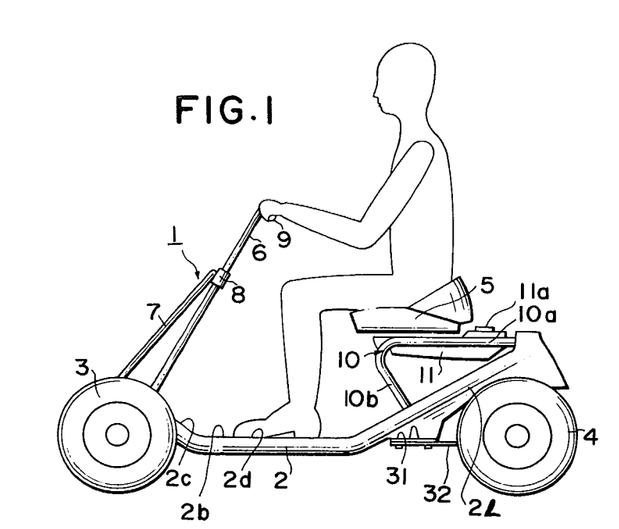
FIG. 1 is a side elevation diagrammatically depicting a vehicle according to the present invention.
Figure 2:
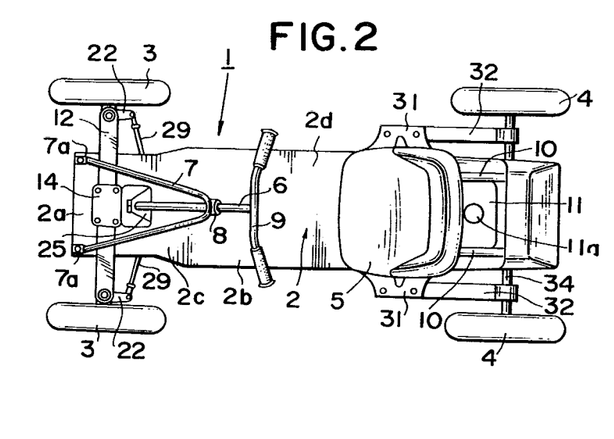
FIG. 2 is a top plan view illustrating the vehicle.

FIGS. 1 and 2 comprise, respectively, a side elevation and a top plan view showing the basic construction of a vehicle according to the present invention.

The general layout of a vehicle 1 according to the present invention will be diagrammatically described in the following.

A frame 2 extending longitudinally of vehicle 1 is provided at the front sides thereof with a pair of front wheels 3, 3 which function as steering wheels, and at the rear sides of frame 2 is provided a pair of rear wheels 4, 4 which function as drive wheels for the vehicle. In other words, the vehicle according to the present embodiment of the invention is a fourwheel vehicle having two front and two rear wheels. The frame 2 is further provided at the center or rear portion thereof, i.e., at substantially a central portion in the longitudinal direction, with a seat 5 which provides a seat for a driver of the vehicle. The seat 5 has a width substantially equal to the width of frame 2. At a front portion and at a widthwise (or transverse) center portion of frame 2 is disposed a steering shaft 6 which extends rearwardly at an inclination. The shaft 6 is mounted on the upper end of an inverted V-shaped stay 7, which in turn has the lower ends thereof 7a, 7a fixed to both sides of the front end of frame 2, and is rotatably fitted in a supporting member 8. To the upper end of shaft 6 is fixed a steering bar 9 which constitutes the handle of the vehicle for performing the steering operations. The frame 2 is formed at the intermediate portion thereof between the steering shaft 6 and the seat 5 with a floor 2d which has substantially the same width as that of seat 5, so as to provide support for the feet of the driver.

Figure 3:
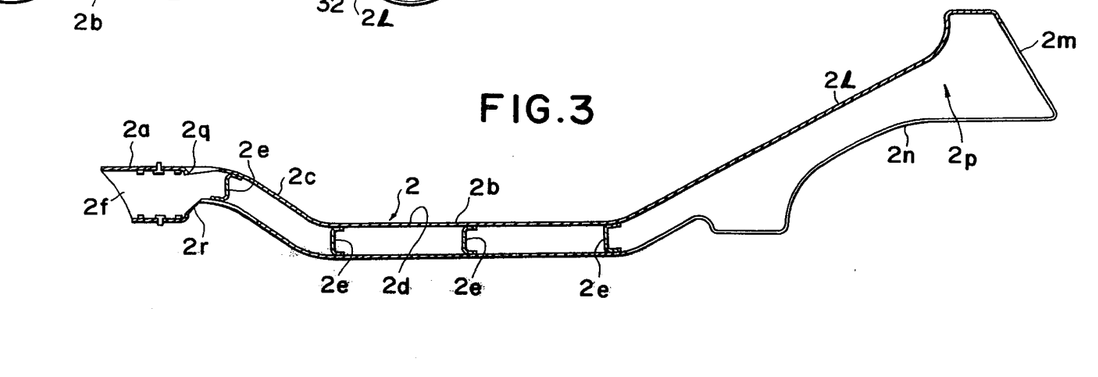
FIG. 3 is an enlarged longitudinal section showing the frame of the vehicle.
Figure 6:
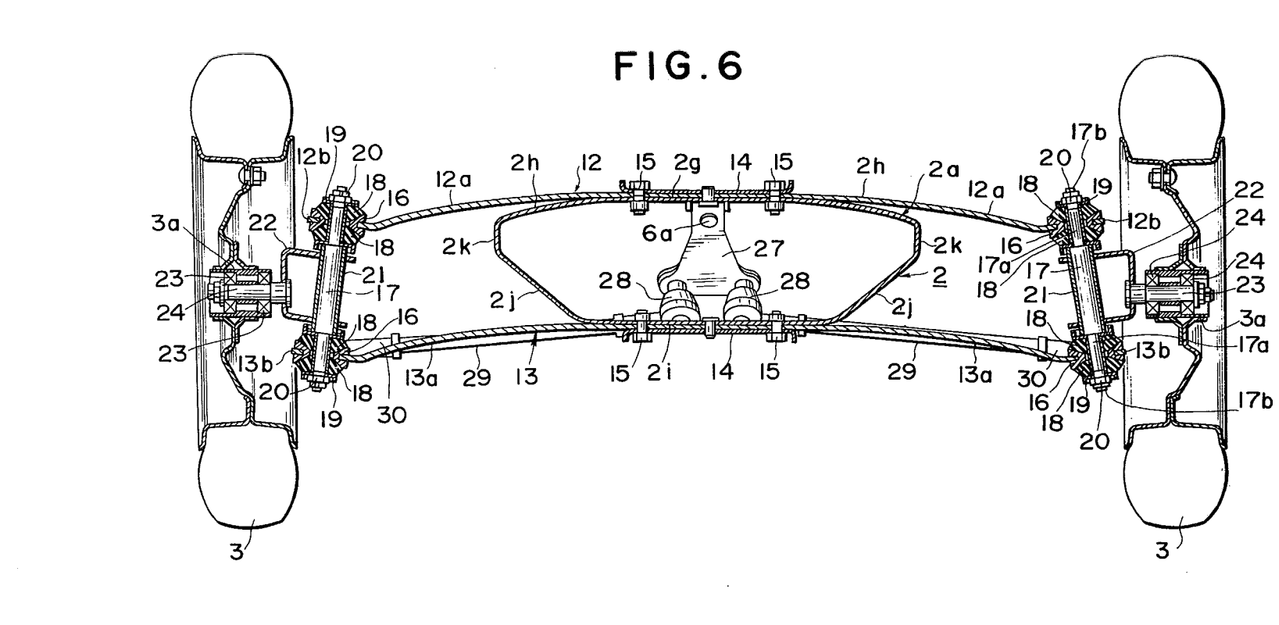
FIG. 6 is an enlarged transverse section showing the front suspension of the vehicle.

With reference to FIGS. 3 and 6, the overall construction of frame 2 is shown. The frame 2 is made of a steel plate which is press-molded into a configuration having a box-shaped cross-section, as shown in FIG. 6, and includes a horizontal front portion 2a, a horizontal intermediate portion 2b, and a sloped connecting portion 2c extending therebetween. A plurality of cross members 2e are mounted in the frame 2 in longitudinally spaced relation, to thereby improve the rigidity and strength of frame 2. The front end of frame 2 is opened at 2f.

The front portion 2a of frame 2 is formed one step higher, as shown in FIG. 3, than the intermediate portion 2b. As shown in FIG. 6, the cross-sectional shape of the front portion 2a is such that an upper portion 2g thereof has its upper side portions 2h, 2h slightly curved downwardly, with the center portion being the highest, and flat. The front portion 2a has a flat lower portion 2i positioned at the lowest level, and both lower side portions 2j, 2j of front portion 2a are inclined upwardly such that such inclined portions 2j, 2j are merged into the warped portions 2h, 2h at side walls 2k, 2k.

Figure 8:
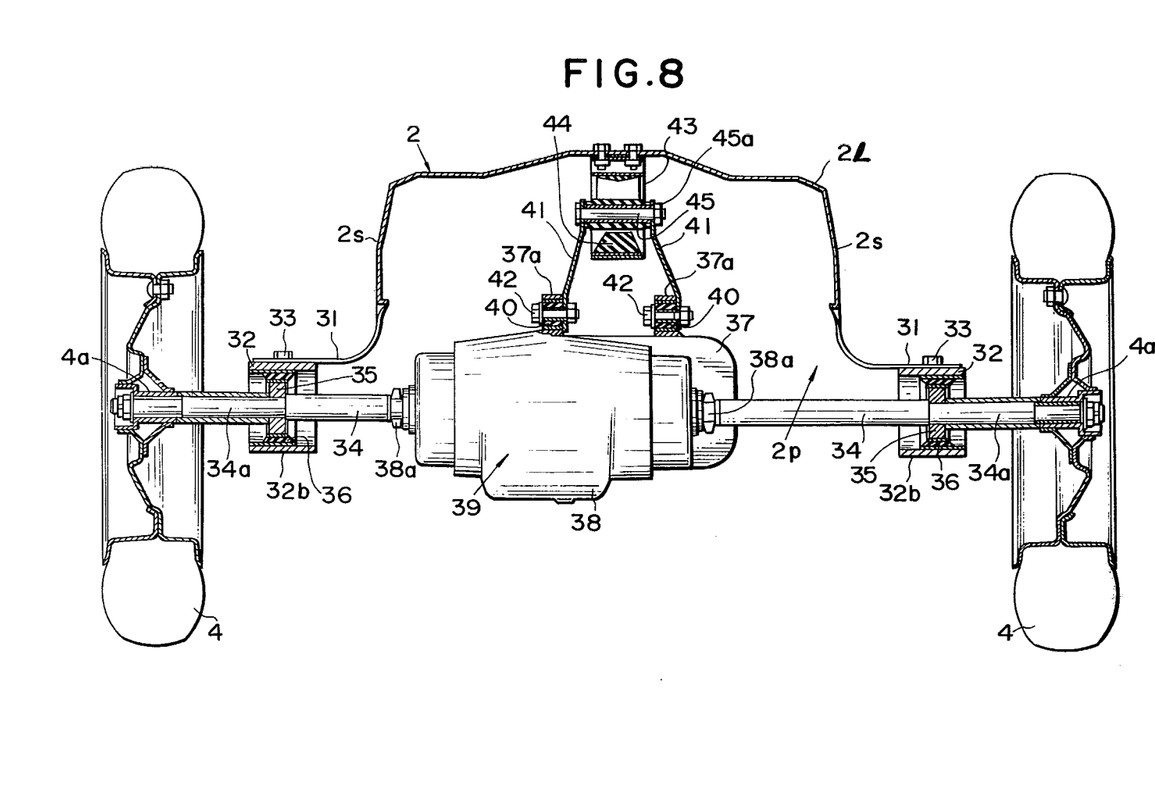
FIG. 8 is a section taken along line 8—8 of FIG. 7.

The rear portion 2L of frame 2 extends rearwardly and upwardly from the rear end of the intermediate portion 2b, at an inclination. The rear portion 2L has the lower and rear end thereof opened at 2m and 2n. As a result, the rear portion 2L is opened downwardly to form a space 2p therein, as shown in FIG. 8.

At both sides of the sloped rear portion 2L of frame 2 is arranged a pair of generally L-shaped stays 10, 10 (FIG. 7), each of which has a horizontal portion 10a thereof connected at its rear end to the upper portion of the rear portion 2L, and a bent depending portion 10b connected to the sloped portion of the rear portion 2L. The seat 5 is mounted on the stays 10, 10 in a transverse manner. A fuel tank 11 is mounted between the stays 10, 10 and below seat 5. The fuel tank 11 has a cap 11a disposed at the back of seat 5 and threadedly fastened on the inlet of tank 11.

Figure 4:
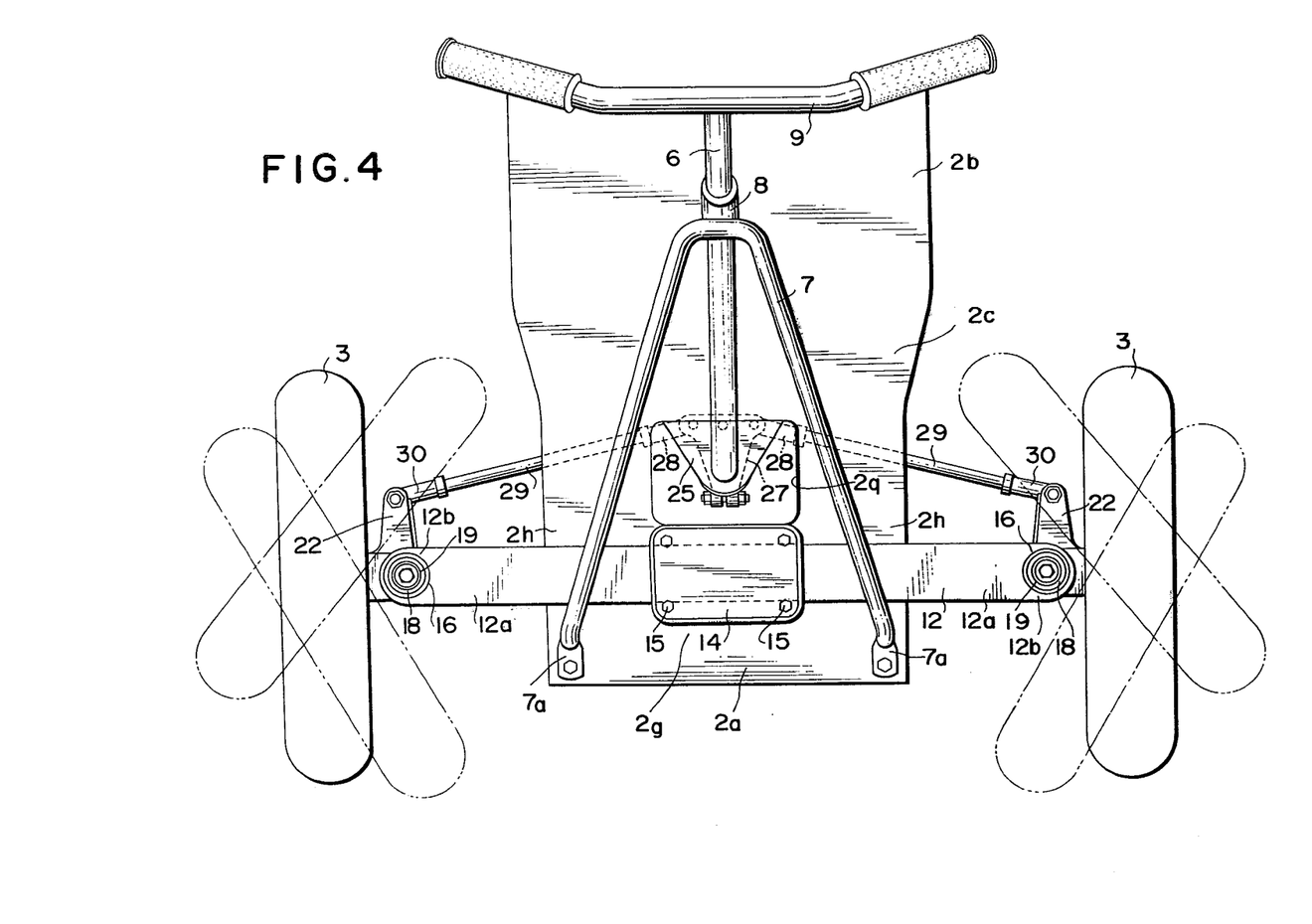
FIG. 4 is an enlarged top plan view depicting a front portion of the vehicle.

As shown in FIGS. 4 and 6, a widthwise extending leaf spring 12 is mounted on the front portion 2a of frame 2 between the lower ends of steering shaft 6 and stay 7. Another leaf spring 13 is mounted on the lower side of the front portion 2a, parallel to spring 12. Thus, the upper and lower parallel leaf springs 12 and 13 are arranged in vertically spaced relation, with the front portion 2a of frame 2 being sandwiched therebetween. Leaf springs 12 and 13 have their longitudinal end portions 12a and 13a extending from the right and left sides of frame 2. The leaf springs 12 and 13 are connected to the outsides of the upper and lower portions 2g and 2i of the front portion 2a, i.e., the spring 12 being connected to the upper side and the spring 13 being connected to the lower side, through holder plates 14, 14 by means of bolts and nuts 15.

The leaf springs 12 and 13 have both end portions 12a and 13a thereof provided with mount portions 12b and 13b which are vertically spaced apart, each mount portion 12b and 13b being provided with a mounting hole within which collars 16, 16 are respectively fitted. A king pin 17 is inserted into the upper and lower collars 16, 16 such that the end portions 17a, 17a of each king pin 17 extend through the mounting holes of leaf springs 12 and 13, respectively. Between the upper and lower end portions 17a, 17a of pin 17 and the upper and lower sides of collars 16, there are mounted a pair of bush-shaped rubber mounts 18, 18 which have both axial ends thereof formed into a frustoconical shape. A washer 19 is attached to the outer end face of mount 18, and a nut 20 is mounted on the axially upper and lower end portions of pin 17 and is fastened to the threaded portions 17b, 17b. As a result, the mounts 18, 18 are compressed in the axial direction of king pins 17 so that pins 17 are connected to both mount portions 12b and 13b of the upper and lower leaf springs 12 and 13.

Mounted on each of the king pins 17 is a bush 21 which is connected to a knuckle 22. To knuckle 22 is fixed a front axle 23 which in turn supports the hub 3a of each of the front wheels 3, 3 through a bearing 24.

As described hereinabove, the front wheels 3, 3 are mounted sideways of the frame front portion 2a and are supported on both end portions of the upper and lower leaf springs 12 and 13 through the elastic members 18, 18. The leaf springs 12 and 13 thus act as suspension members for the right and left front wheels 3, 3 and have an elastic warping action which acts as a shock absorber. For the reactions to be imparted from the road to the front wheels 3, 3, therefore, both of the end portions 12a and 13a of the upper and lower leaf springs 12 and 13 extending sideways from frame 2 can elastically move up and down in parallel with each other, to thereby perform shock absorbing actions in response to the motions of wheels 3, 3. The substantial upward warp of the ends of lower leaf spring 13 is regulated by the sloped portions 2j, whereas the downward warp of the ends of upper leaf spring 12 is regulated by the curved portions 2h. More specifically, the warping motions resulting from the vertical shock absorbing actions of the leaf springs 12 and 13 are regulated by both sides of the front portion 2a of frame 2 so that excessive deformation of leaf springs 12 and 13 can be prevented, with both side portions 2h and 2j acting as stoppers.

Because king pins 17 are connected to leaf springs 12 and 13 through elastic members 18, the fine vibrations of the front wheels resulting from the roughness of the road can be effectively absorbed and attenuated by the actions of elastic members 18. Thus, the transmission of vibrations to frame 2 can be restricted and reduced to improve the riding quality of the vehicle. In this connection, the elastic members 18 are paired at the ends of king pins 17 and are axially forced, while interposing the collars 16 therebetween, by fastening the nuts 20. As a result, the elasticity of elastic members 18 can be varied by adjusting the fastening forces of nuts 20 so that the preferred attenuation can be easily preset merely by adjusting the fastening forces.

A given camber of front wheels 3, 3 is maintained because king pins 17 are supported at their upper and lower ends. More specifically, the camber is returned to its normal angle, even if it changes, by the actions of the elastic members 18. The change in the camber is also absorbed through the deformation of elastic members 18 so that the camber can be maintained at a normal level.

Figure 5:
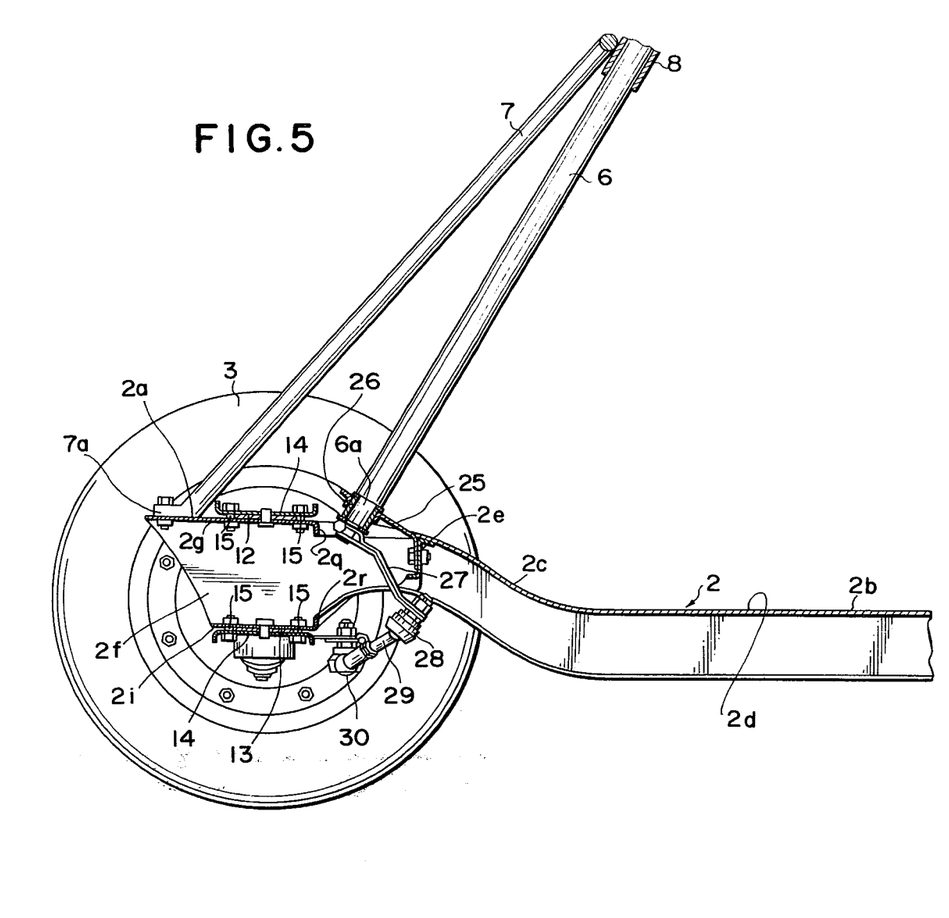
FIG. 5 is an enlarged longitudinal section of a portion of FIG. 4.

The upper and lower portions 2g and 2i of the frame front portion 2a are formed with through-openings 2q and 2r at the back of leaf springs 12 and 13. As shown in FIGS. 4 and 5, a bracket 25 extending forwardly and upwardly at an inclination is mounted to the cross member 2e facing the opening 2q. Bracket 25 supports the lower end 6a of steering shaft 6 in a rotatable manner through a collar 26. To the lower extension of the shaft lower end 6a is connected an arm 27 which extends through the frame front portion 2a such that its lower end portion protrudes from the lower opening 2r. A pair of tie rods 29, 29 are connected at first ends thereof to the lower end portions of arms 27 through joints 28. The second ends of tie rods 29 are connected to knuckles 22 through joints 30, 30. The two joints 28 and 30 act as universal joints to allow the tie rods 29, 29 to follow the vertical movements of knuckles 22, which in turn follow the motions of the end portions of leaf springs 12 and 13, resulting from the motions of the front wheels 3, 3. The arms 27 are almost housed in the front portion 2a of frame 2, whereas the tie rods 29 and the joints 30 are disposed at the back of leaf spring 13. As a result, the steering mechanism thus described has the front portion thereof protected because the leaf springs and other members are arranged in front of same.

It is to be understood that the suspension system of the front wheels as described hereinabove can also be applied to a vehicle having a single rear wheel.

The arrangement of the suspension system for the rear wheels and the engine of vehicle 1 according to the present invention will be described hereinbelow. As apparent from the drawings, in the present embodiment of the invention the vehicle is provided with four wheels, i.e., two front wheels and two rear wheels.

Figure 7:
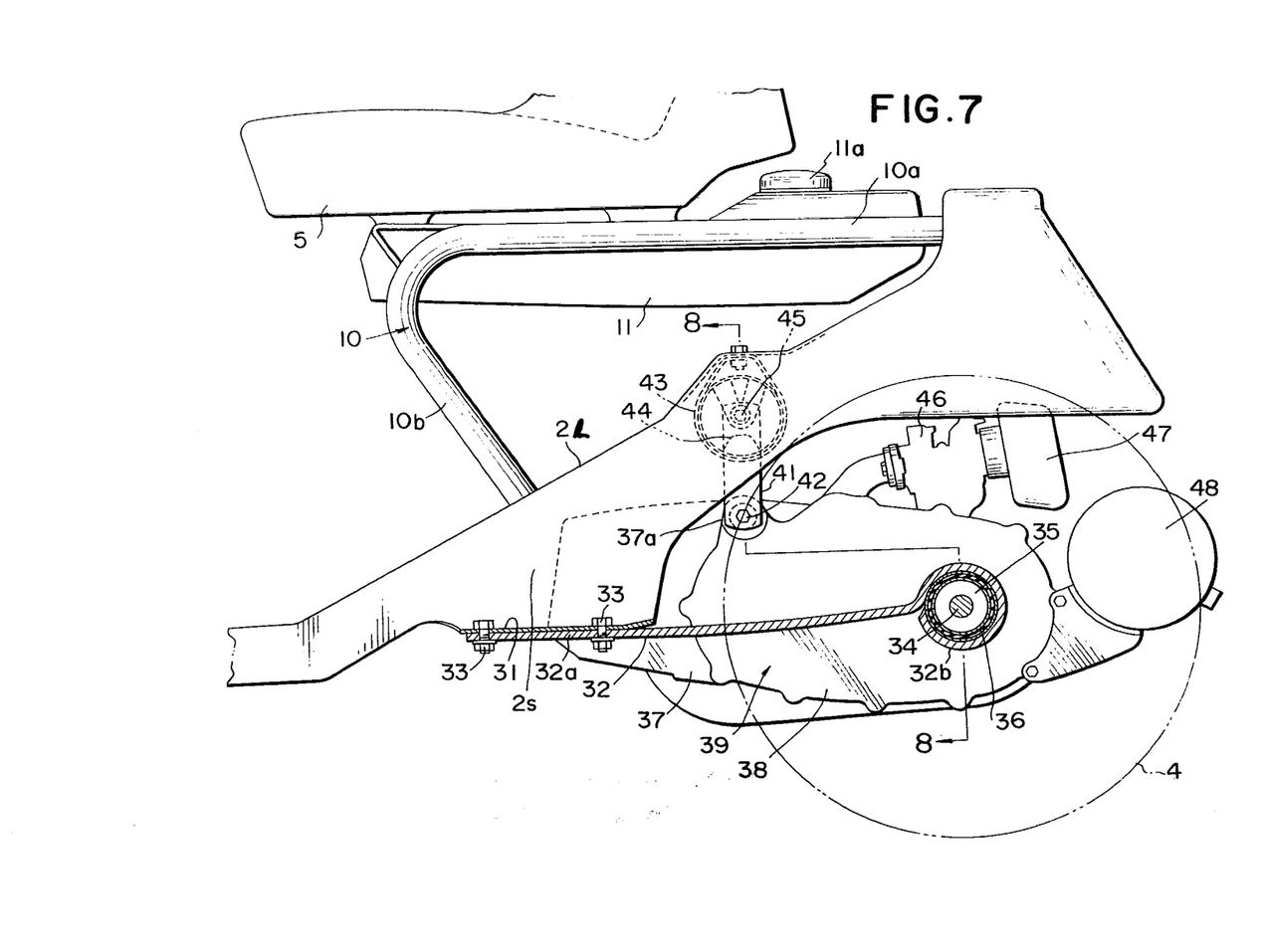
FIG. 7 is an enlarged side elevation of a rear portion of the vehicle, and illustrating an essential portion thereof in section.

With reference to FIGS. 7 and 8, a pair of flanges or mount portions 31, 31 are formed at the lower portion of the rear portion 2L of frame 2 and at the lower ends of both side walls 2s, 2s thereof below seat 5. The flanges 31, 31 are press-molded integrally with frame 2 such that they extend horizontally outwardly from the lower ends of walls 2s, 2s, on both sides of seat 5. Two leaf springs 32, 32 are connected at their base or proximal ends 32a, 32a to the flanges 31, 31 by means of bolts and nuts 33.

As shown in FIGS. 7 and 8, leaf springs 32, 32 comprise very narrow plates which extend rearwardly while having the proximal ends 32a thereof connected to both lower sides of seat 5 at the frame 2 through flanges 31, as described hereinabove. The right and left leaf springs 32, 32 are spaced in the widthwise direction of frame 2, are extended rearwardly in parallel, and have a length which just fails to reach the rear end of frame 2. Each of the leaf springs 32 has its rear end formed into a free end, which is wound into a loop shape to form a rear axle bearing portion 32b. Thus, the transverse extension of leaf springs 32, 32 can be restricted to such an extent as to slightly protrude from both sides of frame 2.

A rear axle 34 acting as a drive shaft is mounted transversely between the bearing portions 32b, 32b of leaf springs 32. The rear axle 34 has both end portions 34a, 34a thereof extended through the bearing portions 32b, 32b so that they protrude to the outsides thereof so as to carry the hubs 4a of the rear wheels 4, 4. More specifically, the extending ends of leaf springs 32, 32 support the rear wheels such that the leaf springs 32, 32 constitute the suspension members for the rear wheels 4, 4. As a result, the leaf springs 32 have their proximal ends 32a connected to frame 2 and their rear axle bearing ends 32b formed into the free ends so that the wheels 4, 4 can elastically move up and down. Thus the leaf spring 32 provide a suspension system which is similar to a trailing arm and which resembles an independent suspension.

In addition, the support of the rear axle 34 by the bearing portions 32b of leaf springs 32 is carried out by mounting a bush-shaped rubber mount 36 between the inner periphery of each of the bearing portions 32b and the outer circumference of a bearing bush 35 which is fitted on the corresponding circumferential portion of the rear axle 34. As a result, the right and left rear wheels 4, 4 are elastically suspended by the leaf springs 32 relative to the vehicle body and by the mounts 36 relative to the leaf springs 32 themselves. Thus, the shock absorbing effects upon the rear wheels can be enhanced, and the compliance of the right and left rear wheels during the cornering operation can be effectively improved by the action of the mounts. Moreover, because the leaf springs 32, 32 act as cantilever supports for rear wheels 4, 4, in addition to the effects of the above described trailing arm, it is possible to make the length of leaf springs 32 as short as possible while extending rearwardly and to have a large swinging stroke in the vertical direction while the leaf springs 32 themselves are shortened. As a result, the wheel base of the vehicle can be accordingly shortened in relation to the front wheels 3.

Figure 9:
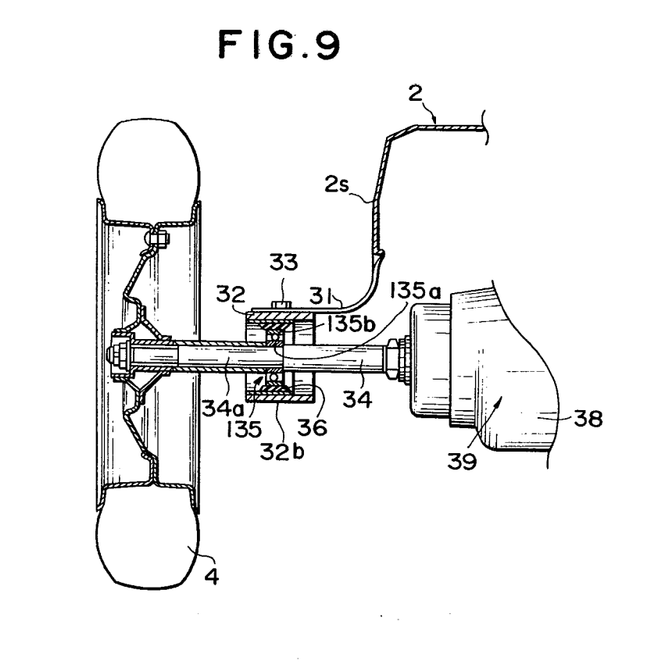
FIG. 9 is similar to FIG. 8, and depicts a modification of the rear axle supporting portion of FIG. 8.

As shown in FIG. 9, the support of the axles 34 by the bearing portions 32b, 32b is carried out by mounting a ball bearing 135 upon the outer circumference of each of the axles 34 to support the axle at the inner race 135a thereof and by jointing the outer race 135b to the inner circumference of a rubber mount 36. As a result, the rotations of the axles can be further smoothened.

The engine of the vehicle 1 has a unit 39 which is formed integrally of an engine body 37 and a transmission case 38. The engine unit 39 is arranged, as shown in FIG. 8, between the right and left leaf springs 32, 32 below the rear portion 2L of frame 2 and in a position to face the space 2p opened at 2m and 2n. Above the engine 37, there is arranged a pair of brackets 37a, 37a which are spaced apart from each other in the widthwise direction and which are connected to and supported by a pair of suspension plates 41, 41 through rubber mounts 40 by means of bolts and nuts 42.

From the lower side of the rear portion 2L of frame 2, on the other hand, there depends a bracket 43, to the center of which a pin 45 is transversely mounted through a mount rubber mount 44. The pin 45 has both ends thereof connected to the upper ends of the suspension plates 41, 41. In the embodiment shown, the pin 45 comprises a bolt, to which a nut 45a is fastened to connect the plates 41, 41.

With reference to FIG. 7, there is generally depicted a carburetor 46, an air cleaner case 47, and a muffler 48.

The engine unit 39 is mounted in the downwardly opened space 2p of the rear portion 2L of frame 2 and is suspended by the mount rubbers from frame 2. Because the rubber mounts are disposed at the three points at which mounts, i.e., at the two points 40, 40 are disposed at the side of engine unit 39, and at the point at which mount 44 is disposed at the side of frame 2, the engine unit 39 can smoothly follow the longitudinal, transverse and vertical motions of the rear wheels 4, 4 so that they can elastically support and protect the engine. Moreover, the vibrations of rear wheels 4, 4 and the engine 37 can be effectively attenuated through the above described rubber mounts, thus ensuring excellent vibration-preventing effects.

In addition, the mounting portion of engine unit 39 is disposed at a widthwise center between rear wheels 4, 4 and the engine body 37 which has the center of gravity of the unit 39 is disposed at substantially the center in the longitudinal direction of leaf springs 32, as shown in FIGS. 7 and 8. As a result, a heavy power unit can be effectively mounted while improving space utility and ensuring a preferred layout with respect to rigidity. Because the unit 39 is arranged at the center between rear wheels 4, 4, the transverse balance at the rear of the vehicle can be improved to a satisfactory level, even for inertia occurring during cornering operations of the vehicle.

The engine unit 39 is connected to the rear axles 34. More specifically, the rear axle 34 is axially divided, as shown in FIG. 8, into two halves 34 and 34, which have their inner ends connected in alignment to the output shaft portions 38a, 38a extending from both sides of the transmission case 38 at the rear of the unit 39 to constitute a power unit integrated with the rear axles. Thus, the unit 39 is arranged on the axis of the rear axles 34, 34 at the vertical and transverse center of a space between the rear wheels. As a result, the engine unit 39 is disposed at a relatively low position in the vehicle, to thereby lower the center of gravity of the vehicle, and to eliminate the drawback caused by inertia during cornering operations when the driver is sitting on seat 5, thus remarkably improving stability. Moreover, because the unit is connected in alignment to the rear axles, space utility is advantageous, and the construction is so remarkably simplified as to eliminate the need for a complicated transmission drive system.

As described hereinabove, the power unit 39 is arranged in the downwardly opened space 2p of the rear frame portion 2L in accordance with the above described layout, to thereby improve the space utility and stability of the vehicle, as well as to simplify the transmission drive system so that the mounting of the engine can be effectively accomplished with a minimum number of parts.

In the illustrated embodiment, because the rear portion 2L is opened at its lower side and is inclined, the air flow having passed below the intermediate portion 2b of frame 2 is guided by the slope of the rear portion 2L to pass around the engine 37 so that the engine 37 is forcibly and efficiently cooled down.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A front wheel suspension mechanism for a vehicle having two front wheels and at least one rear wheel, comprising:
    two transverse leaf springs mounted on a front portion of a frame of said vehicle;
    said leaf springs being vertically spaced apart;
    each said leaf spring having a mounting hole formed in each end portion thereof;
    substantially vertically disposed king pins for supporting horizontal axles of said front wheels, said king pins being fitted in substantially upright positions between said vertically spaced apart leaf springs with the upper end portions of said king pins extending through said mounting holes of the upper one of said leaf springs and the lower end portions of said king pins extending through said mounting holes of the lower one of said leaf springs; and
    elastic members interposed between both end portions of said leaf springs and said end portions of said king pins, said elastic members being adjustably compressed axially of said king pins to elastically connect said leaf springs and said king pins.

2. A front wheel suspension mechanism according to claim 1, wherein:
    said elastic members are substantially bush-shaped; and
    a pair of said elastic members are provided at each end portion of each said leaf spring, said elastic members being disposed one on each of the upper and lower sides of each said leaf spring end portion around said end portions of said king pins.

3. A front wheel suspension mechanism according to claim 2, wherein:
    said substantially bush-shaped elastic members have both axial ends thereof formed into a substantially frustoconical shape.

4. A front wheel suspension mechanism according to claim 1, further comprising:
    knuckle arms for supporting the axles of said front wheels;
    said king pins being connected between said knuckle arms and the ends of said leaf springs so as to provide pivotal connections therebetween;
    a steering shaft mounted on said vehicle frame; and
    tie rods connected through joints between said steering shaft and said knuckle arms so that said front wheels may be steered.

5. A front wheel suspension mechanism according to claim 1, wherein:
    the frame for supporting said vertically spaced apart leaf springs is formed to have a substantially box-shaped cross-section such that both sides thereof may act as stoppers for the vertical warping motions of the ends of said leaf springs.

* * * * *